US012665218B2

(12) United States Patent　　　(10) Patent No.:　US 12,665,218 B2
Kanai　　　　　　　　　　　　　　(45) Date of Patent:　Jun. 23, 2026

(54) LITHIUM ION-CONDUCTING GARNET TYPE OXIDE

(71) Applicant: KANEKA CORPORATION, Osaka (JP)

(72) Inventor: Kazuaki Kanai, Osaka (JP)

(73) Assignee: KANEKA CORPORATION, Osaka (JP)

( * ) Notice:　Subject to any disclaimer, the term of this patent is extended or adjusted under 35 U.S.C. 154(b) by 874 days.

(21) Appl. No.: 18/047,277

(22) Filed:　Oct. 18, 2022

(65)　　　　　Prior Publication Data

US 2023/0064947 A1　　Mar. 2, 2023

Related U.S. Application Data

(63) Continuation of application No. PCT/JP2021/011407, filed on Mar. 19, 2021.

(30)　　　Foreign Application Priority Data

Jun. 15, 2020　(JP) ................................. 2020-102995

(51) Int. Cl.
　　*H01M 10/0562*　　(2010.01)
　　*C01G 25/00*　　　(2006.01)
　　*H01M 10/0525*　　(2010.01)
(52) U.S. Cl.
　　CPC ...... *H01M 10/0562* (2013.01); *C01G 25/006* (2013.01); *C01P 2002/30* (2013.01); *C01P 2002/50* (2013.01); *C01P 2002/77* (2013.01); *C01P 2006/40* (2013.01); *H01M 10/0525* (2013.01); *H01M 2300/0071* (2013.01)
(58) Field of Classification Search
　　CPC ......... H01M 10/0562; H01M 10/0525; H01M 2300/0071; C01G 25/006; C01P 2002/30; C01P 2002/77; C01P 2006/40; C04B 35/5152; C04B 2235/3203; C04B 2235/3227; C04B 2235/3244; C04B 2235/3286; C04B 2235/444; C04B 2235/761; C04B 2235/764; Y02E 60/10; H01B 1/08
See application file for complete search history.

(56)　　　　　References Cited

U.S. PATENT DOCUMENTS

2015/0044575 A1　2/2015　Kawaji et al.
2016/0111751 A1　4/2016　Badding et al.

FOREIGN PATENT DOCUMENTS

CN　　106129466 A　　11/2016
JP　　2015-035334 A　　2/2015
WO　　2015/079509 A1　6/2015

OTHER PUBLICATIONS

International Search Report issued in corresponding International Application No. PCT/JP2021/011407 mailed Apr. 27, 2021 (11 pages).
Written Opinion issued in corresponding International Application No. PCT/JP2021/011407 mailed Apr. 27, 2021 (5 pages).
Lu et al., Effects of Fluorine Doping on Structural and Electrochemical Properties of Li6.25Ga0.25La3Zr2O12 as Electrolytes for Solid-State Lithium Batteries, Applied Materials & Interfaces, 2019, vol. 2019 No. 11, p. 2042-2049 (8 pages).

*Primary Examiner* — Aiqun Li
(74) *Attorney, Agent, or Firm* — Osha Bergman Watanabe & Burton LLP

(57)　　　　　ABSTRACT

An oxide-based solid electrolyte with a high lithium ion conductance is provided. A lithium ion-conducting garnet type oxide includes Li, La, Ga, Zr, a halogen element, and oxygen. A lithium ion conductivity at room temperature is not lower than $1.0 \times 10^{-3}$ S/cm. A proportion of Ga with respect to 1 mole of the oxide may be not larger than 0.5 moles. The halogen element may be at least one type selected from the group consisting of Cl, Br, and I, and a proportion of Li with respect to 1 mole of the oxide may be not smaller than 6.1 moles and smaller than 6.5 moles.

7 Claims, No Drawings

LITHIUM ION-CONDUCTING GARNET TYPE OXIDE

TECHNICAL FIELD

One or more embodiments of the present invention relate to a lithium ion-conducting garnet type oxide.

BACKGROUND

Research and development of Li ion secondary batteries have been actively conducted for mobile devices, hybrid automobiles, electric automobiles, and household power storage applications. Li ion secondary batteries used in these fields are required to have high safety, long-term cycle stability, high energy density, and the like.

Among them, all-solid-state batteries in which solid electrolytes are used have been attracting attention because of the high safety thereof. Although solid electrolytes include sulfide-based solid electrolytes and oxide-based solid electrolytes, development of oxide-based solid electrolytes which have higher safety is desired. As an oxide-based solid electrolyte, a solid electrolyte of which main constituent elements are lithium, lanthanum, and zirconium has been proposed. For example, Patent Literature 1 discloses a lithium ion-conducting oxide that contains lithium, lanthanum, zirconium, and oxygen as a chemical composition, and to which a halogen is added. Patent Literature 1 discloses that a lithium ion-conducting oxide that has an ion conductance of 0.23 to 0.39 mS/cm at 25° C. was realized.

PATENT LITERATURE

PATENT DOCUMENT 1: WO2015/079509

However, it is very difficult to improve the ion conductance in an oxide-based solid electrolyte. In Patent Literature 1, the ion conductance at room temperature that was able to be attained was 0.23 to 0.39 mS/cm, that is, $2.3 \times 10^{-4}$ to $3.9 \times 10^{-4}$ S/cm, being a value at a $10^{-4}$ S/cm order. Since oxide-based solid electrolytes have higher safety than sulfide-based solid electrolytes, it is extremely useful for industry to realize an oxide-based solid electrolyte having a high lithium ion conductance.

Therefore, one or more embodiments of the present invention provide an oxide-based solid electrolyte that has a lithium ion conductance higher than or equivalent to that of conventional art, and that has a different composition from that of conventional art.

SUMMARY

One or more embodiments of the present invention are as follows.

[1] A lithium ion-conducting garnet type oxide comprising

Li, La, Ga, Zr, a halogen element, and oxygen, wherein a lithium ion conductivity at room temperature is not lower than $1.0 \times 10^{-3}$ S/cm.

[2] The lithium ion-conducting garnet type oxide according to [1], wherein a proportion of Ga with respect to 1 mole of the oxide is not larger than 0.5 moles.

[3] The lithium ion-conducting garnet type oxide according to [1] or [2], wherein the halogen element is at least one type selected from the group consisting of Cl, Br, and I, and a proportion of Li with respect to 1 mole of the oxide is not smaller than 6.1 moles and smaller than 6.5 moles.

[4] A lithium ion-conducting garnet type oxide comprising

Li, La, Zr, a halogen element, and oxygen, the lithium ion-conducting garnet type oxide having an Li site not being substituted with another element, wherein a proportion of the halogen element with respect to a total of all elements constituting the oxide is not higher than 0.20 atom %.

[5] The lithium ion-conducting garnet type oxide according to any one of [1] to [4], wherein the halogen element is Cl, and a proportion of Cl with respect to a total of all elements constituting the oxide is not higher than 0.20 atom %.

[6] The lithium ion-conducting garnet type oxide according to any one of [1] to [5], wherein the halogen element is Cl, and a lattice constant is not smaller than 12.98 Å.

[7] The lithium ion-conducting garnet type oxide according to any one of [1] to [6], wherein the halogen element is Cl, and a Cl amount inside the lithium ion-conducting garnet type oxide is larger than a Cl amount at a surface of the oxide.

[8] The lithium ion-conducting garnet type oxide according to [7], wherein a halogen amount:$C_{Cl}$ (7 nm) at a position at a depth of 7 nm from the surface of the lithium ion-conducting garnet type oxide is larger than a halogen amount: $C_{Cl}$ (surface) at the surface of the oxide, and a halogen amount:$C_{Cl}$ (43 nm) at a position at a depth of 43 nm from the surface of the lithium ion-conducting garnet type oxide is larger than $C_{Cl}$ (7 nm).

[9] The lithium ion-conducting garnet type oxide according to any one of [1] to [4], wherein the halogen element is Br or I, and a lattice constant is not larger than 13.00 Å.

[10] The lithium ion-conducting garnet type oxide according to any one of [1] to [9], wherein a relative density is not lower than 75%.

[11] A production method for a lithium ion-conducting garnet type oxide, comprising:

molding a mixture of an Li halide and a garnet-type oxide that contains Li, La, Zr, and oxygen; and sintering an obtained molded product for not less than 30 minutes at a temperature higher than 1200° C.

[12] The production method according to [11], wherein an Li site of the garnet-type oxide that contains Li, La, Zr, and oxygen is substituted with Ga.

According to one or more embodiments of the present invention, a lithium ion-conducting oxide: that has lithium, lanthanum, zirconium as main constituent elements and further contains a halogen element as disclosed in Patent Literature 1; that has a highly enhanced lithium ion conducting performance or a lithium ion conductance equivalent to that in conventional art; and that has a composition different from that of conventional art, has been able to be provided.

DETAILED DESCRIPTION

The present inventor has realized a garnet-type oxide (hereinafter, this may be referred to as "garnet-type oxide (Ga-substituted)" or "oxide (Ga-substituted)") that contains a halogen element as disclosed in Patent Literature 1, that has a significantly improved lithium ion conducting performance when compared with that of the garnet-type oxide of Patent Literature 1, and that has a lithium ion conductivity at room temperature of not lower than $1.0\times10^{-3}$ S/cm. The lithium ion conductivity at a $10^{-3}$ S/cm order at room temperature is an extremely excellent ion conductivity for an oxide-based solid electrolyte. The lithium ion conductivity at room temperature may be not lower than $1.2\times10^{-3}$ S/cm, not lower than $1.3\times10^{-3}$ S/cm, higher than $1.6\times10^{-3}$ S/cm, not lower than $1.7\times10^{-3}$ S/cm, or not lower than $1.8\times10^{-3}$ S/cm. The upper limit is not limited in particular, and is $2.5\times10^{-3}$ S/cm, for example. The oxide (Ga-substituted) of one or more embodiments of the present invention exhibits a good lithium ion conducting performance, and thus is suitably used as a solid electrolyte.

An oxide (Ga-substituted) of one or more embodiments of the present invention that can exhibit the above lithium ion conductivity contains Li, La, Ga, Zr, a halogen element, and oxygen, and has a garnet-type crystal structure. The oxide of one or more embodiments of the present invention only needs to contain the elements and have a garnet-type crystal structure, and more specifically, contains at least Li, La, Ga, Zr, and oxygen in the skeleton of the garnet structure, and further contains a halogen element. When at least Li, La, Ga, Zr, and oxygen are contained in the skeleton of the garnet structure, the Li site may be substituted with Ga.

In a composition of a lithium ion-conducting garnet type oxide that contains Li, La, Ga, and Zr and further contains a halogen element, it is desirable that the proportion of Ga with respect to 1 mole of the oxide is not larger than 0.5 moles, for attaining a lithium ion conductivity of not lower than $1.0\times10^{-3}$ S/cm at room temperature. The proportion of Ga may be not larger than 0.30 moles, not larger than 0.28 moles, not larger than 0.27 moles, or not larger than 0.26 moles, and may be not smaller than 0.1 moles, or not smaller than 0.15 moles.

The proportion of Li with respect to 1 mole of the oxide may be not smaller than 6.1 moles, not smaller than 6.16 moles, not smaller than 6.19 moles, not smaller than 6.22 moles, not larger than 6.7 moles, not larger than 6.55 moles, or smaller than 6.5 moles.

The halogen element may substitute a part of another element (oxygen atom, in particular) constituting a garnet crystal, to form the garnet crystal together with other elements (i.e., Li, La, Ga, Zr, and oxygen), or may be present in a state where the halogen element does not substitute another element. In a case where the halogen element does not substitute another element, it is considered that a compound is formed by the halogen element and another element, for example. Whether or not another element has been substituted with the halogen element can be known from a lattice constant obtained by using a (400)-plane peak among X-ray diffraction peaks shown in Examples described later.

As for Li, La, Ga, Zr, and oxygen, while the basic configuration is a garnet-type oxide of $Li_7La_3Zr_2O_{12}$, a part of the Li site may be substituted with Ga, and for example, the oxide may be represented by a composition formula of $Li_{7-3x}Ga_xLa_3Zr_2O_{12}$ ($0<x\leq0.5$). x denotes the proportion of Ga with respect to 1 mole of the oxide, and as for a preferable range, the description of the preferable proportion of Ga described above can be referred to. That is, x may be not larger than 0.30, not larger than 0.28, not larger than 0.27, or not larger than 0.26, and may be not smaller than 0.1, or not smaller than 0.15. In the lithium ion-conducting garnet oxide (Ga-substituted) of one or more embodiments of the present invention, also when Li, La, Ga, Zr, and oxygen constitute the composition formula, the halogen element may be present while substituting a part of elements in the composition formula, or may not necessarily substitute a part of the elements.

Preferably, the halogen element is at least one type selected from the group consisting of Cl, Br, and I. In this case, it is further preferable that the proportion of Li with respect to 1 mole of the oxide is not smaller than 6.1 moles and smaller than 6.5 moles. More preferably, the halogen element is Cl.

The halogen element amount obtained through EDS analysis of the oxide (Ga-substituted) of one or more embodiments of the present invention shown in Examples described later may be, with respect to the entirety of the oxide of one or more embodiments of the present invention, not lower than 0.01 at %, not lower than 0.02 at %, not lower than 0.08 at %, not lower than 0.10 at %, not higher than 2.5 at %, or not higher than 2.0 at %. In particular, when the halogen element is Cl, the Cl amount may be, with respect to the entirety of the oxide of one or more embodiments of the present invention, not higher than (not including 0%) 0.20 at %, 0.02 to 0.20 at %, or 0.05 to 0.15 at %. When the halogen element is Br or I, it is also preferable that the Br amount or the I amount is 0.5 to 2.0 at % with respect to the entirety of the oxide of one or more embodiments of the present invention. The above-described Cl amount, Br amount, and I amount with respect to the entirety of the oxide denote the Cl amount, the Br amount, and the I amount with respect to the total amount of all elements obtained by performing EDS analysis to measure elements constituting the oxide of one or more embodiments of the present invention and the element amounts thereof under conditions of an acceleration voltage of 5 kV in the case of Cl and an acceleration voltage of 15 kV in the case of Br and I.

One or more embodiments of the present invention also include a lithium ion-conducting garnet type oxide (hereinafter, this may be referred to as "garnet-type oxide (non-substituted)" or "oxide (non-substituted)") that contains Li, La, Zr, a halogen element, and oxygen, and of which the Li site is not substituted with another element, and in the oxide, the proportion of the halogen element with respect to the entirety of the oxide is not higher than 0.20 atom %. The halogen element amount in the garnet-type oxide (non-substituted), similar to that described with respect to the oxide (Ga-substituted) of one or more embodiments of the present invention, denotes the halogen element amount obtained through EDS analysis. The halogen element amount may be 0.01 to 0.15 at %, 0.01 to 0.10 at %, or 0.01 to 0.05 at %. The lithium ion conductivity at room temperature of the garnet-type oxide (non-substituted) of one or more embodiments of the present invention is not lower than $3.0\times10^{-5}$ S/cm and not higher than $6.0\times10^{-4}$ S/cm, for example.

The lattice constant of the oxide of one or more embodiments of the present invention is usually not smaller than 12.95 Å, more preferably not smaller than 12.97 Å, further preferably not smaller than 12.98 Å, and still further preferably not smaller than 13.00 Å. The upper limit of the lattice constant is not limited in particular, and is not larger than 13.15 Å, for example.

When the halogen element is Cl, the lattice constant obtained by using a (400)-plane peak among X-ray diffraction peaks shown in Examples described later may be not smaller than 12.98 Å. When the halogen element is Cl, the lattice constant can be made large when compared with a case where the halogen element is not contained, and in such a case, it is considered that a part of oxygen atoms is substituted with Cl. In the oxide of one or more embodiments of the present invention, it is particularly preferable that the halogen element is Cl, the lattice constant is not smaller than 12.98 Å, and the proportion of the halogen element is not higher than (not including 0%) 0.20 at %.

When the halogen element is Br or I, the lattice constant may be not larger than 13.00 Å, not larger than 12.99 Å, or not larger than 12.98 Å.

As described later, the oxide of one or more embodiments of the present invention is an oxide obtained by molding a mixture of an Li halide and a garnet-type oxide (not containing a halogen element) that contains Li, La, Zr, and oxygen, and sintering the obtained molded product for not less than 30 minutes at a temperature higher than 1200° C. In particular, when the halogen element contained in the oxide is Cl, the oxide obtained by such a production method can have a feature in which the Cl amount inside the oxide is larger than the Cl amount at the surface of the oxide. For example, the halogen amount at a position at a depth of 7 nm from the surface of the oxide of one or more embodiments of the present invention:$C_{Cl}$ (7 nm) may be larger than the halogen amount at the surface of the oxide:$C_{Cl}$ (surface), and the $C_{Cl}$ (7 nm) may be not smaller than 5 times and not larger than 13 times the $C_{Cl}$ (surface). Further, the halogen amount at a position at a depth of 43 nm from the oxide surface of one or more embodiments of the present invention:$C_{Cl}$ (43 nm) may be larger than the $C_{Cl}$ (7 nm), and the $C_{Cl}$ (43 nm) may be not smaller than 1.5 times and not larger than 4 times the $C_{Cl}$ (7 nm). The Cl amount at the surface of the oxide and the Cl amounts at positions at a depth of 7 nm and 43 nm denote values analyzed by X-ray photoelectron spectroscopy (XPS). As shown in Examples described later, measurement according to XPS may be performed by using an XPS device (PHI 5000 Versal Probe II, manufactured by ULVAC-PHI, Inc.) under a condition of excitation X-ray:Al Kα; X-ray output:15 kV, 25 W; pass energy:187.85 eV (wide scanning), 58.7 eV (narrow scanning); and charge correction:284.6 eV (C1s). The sputter depth was expressed in terms of $SiO_2$.

The oxide of one or more embodiments of the present invention may be a cubic crystal. The oxide of one or more embodiments of the present invention being a cubic crystal is preferable because a good ion conducting performance can be realized.

The activation energy measured by the method according to Examples described later may be not larger than 0.50 eV, not larger than 0.40 eV, not larger than 0.35 eV, or not larger than 0.30 eV. The lower limit is not limited in particular, and is 0.15 eV, for example.

The oxide of one or more embodiments of the present invention may be a sintered body. The oxide of one or more embodiments of the present invention may have a relative density of not lower than 70%. When the relative density is made large, the lithium ion conducting performance can be increased. The relative density may be not lower than 75%, not lower than 80%, or not lower than 85%. The upper limit may be 98%, for example. The relative density is a value obtained by dividing a density obtained from the weight and volume (the volume can be obtained from dimensions) of the oxide of one or more embodiments of the present invention, by a value of 5.11 g/cm³ being a theoretical density of $Li_{6.25}Ga_{0.25}La_3Zr_2O_{12}$ or $Li_7La_3Zr_2O_{12}$.

The lithium ion-conducting garnet type oxide of one or more embodiments of the present invention can be obtained by a production method in which a mixture of an Li halide and a garnet-type oxide (not containing a halogen element) that contains Li, La, Zr, and oxygen is molded, and the obtained molded product is sintered for not less than 30 minutes at a temperature higher than 1200° C. Hereinafter, the garnet-type oxide (not containing a halogen element) that contains Li, La, Zr, and oxygen in the production method will be referred to as a "raw material LLZ". The raw material LLZ includes: a garnet-type oxide (e.g., $Li_7La_3Zr_2O_{12}$) that contains Li, La, Zr, and oxygen and does not contain a halogen element, and of which the Li site is not substituted with another element; or a garnet-type oxide that contains Li, La, Ga, Zr, and oxygen and does not contain a halogen element. When the raw material LLZ is a garnet-type oxide that contains Li, La, Zr, and oxygen and does not contain a halogen element, and of which the Li site is not substituted with another element, the oxide (non-substituted) of one or more embodiments of the present invention can be obtained. When the raw material LLZ is a garnet-type oxide that contains Li, La, Ga, Zr, and oxygen and does not contain a halogen element, the oxide (Ga-substituted) of one or more embodiments of the present invention can be obtained.

In a case where the raw material LLZ is a garnet-type oxide that contains Li, La, Ga, Zr, and oxygen and does not contain a halogen element, the raw material LLZ may be an oxide that has a basic configuration of a garnet-type oxide of $Li_7La_3Zr_2O_{12}$, and of which a part of the Li site is substituted with Ga, and may be an oxide represented by $Li_{7-3x}Ga_xLa_3Zr_2O_{12}$ ($0<x\leq0.5$). x denotes the proportion of Ga with respect to 1 mole of the oxide, and as for a preferable range, the description of the preferable proportion of Ga described above can be referred to. The Li halide may be LiCl, LiI, or LiBr, and two or more types of these may be used in combination. The Li halide may contain LiCl, and may be LiCl.

The proportion of the Li halide with respect to 100 parts by mass of the raw material LLZ may be not smaller than 1 part by mass, not smaller than 3 parts by mass, or not smaller than 5 parts by mass, and the upper limit may be not larger than 15 parts by mass, not larger than 12 parts by mass, or not larger than 10 parts by mass.

The mixture obtained by mixing the Li halide and the garnet-type oxide (the raw material LLZ) that contains Li, La, Ga, Zr, and oxygen is molded into a molded body such as a pellet, and then sintered. The pressure during the molding is 200 to 400 MPa, for example. The mixing and molding each may be performed in an environment in which the dew-point temperature is about −120° C. to −40° C. The molded body is sintered for not less than 30 minutes at a temperature higher than 1200° C. The sintering temperature may be not lower than 1230° C., and the upper limit is 1300° C., for example. The sintering time may be not less than 1 hour, not less than 5 hours, or not less than 10 hours, and the upper limit of the sintering time is 30 hours, for example. Sintering may be performed in an environment in which the moisture amount in the atmosphere is reduced, and sintering may be performed while an inert gas (nitrogen, argon, or the like) having a dew-point value of about −70° C. to −40° C. is caused to flow at a flow rate of 1 to 5 L/min, for example. It is also preferable to perform sintering while the molded body is disposed on a spread-out powder of $Li_7La_3Zr_2O_{12}$.

The present application claims the benefit of the priority based on Japanese patent application No. 2020-102995 filed on Jun. 15, 2020. All the contents described in Japanese Patent Application No. 2020-102995 filed on Jun. 15, 2020 are incorporated herein by reference.

EXAMPLES

One or more embodiments of the present invention will be described in more detail below by means of Examples. One or more embodiments of the present invention are not limited by the following Examples, and can also be carried out with appropriate modifications being made within the scope of the gist described above and below, and any of these modifications are included in the technical scope of one or more embodiments of the present invention.

Sintered pellets obtained in Examples and Comparative Example were measured by the following method.

(1) Lithium Ion Conductivity and Activation Energy

Au was sputtered on both surfaces of a sintered pellet obtained in each of Examples and Comparative Examples below, to form an electrode having a diameter of 8 mm. The obtained sample was set to an all-solid-state battery evaluation cell manufactured by Hohsen Corp., and connected to a potentiostat/galvanostat. Then, impedance measurement was performed in a temperature range from room temperature to 100° C., and the Li ion conductivity at room temperature was evaluated. In addition, an activation energy was calculated from an Arrhenius plot in which a value of the ion conductivity at each temperature was used. In a case where the ion conductivity evaluated through the impedance measurement was classified into an ion conductivity based on contribution from bulk crystals and an ion conductivity based on contribution from grain boundaries, the value of $\sigma_{Bulk}$ (S/cm) corresponding to the bulk crystal site was also indicated together with a total conductivity $\sigma_{Total}$ (S/cm).

(2) Measurement of Relative Density

The weight of the sintered pellet was measured, the density was calculated from the dimensions of the pellet and the weight, and the density was divided by 5.11 g/cm³ being a theoretical density of $Li_{6.25}Ga_{0.25}La_3Zr_2O_{12}$ or $Li_7La_3Zr_2O_{12}$, whereby a relative density (%) was calculated.

(3) Measurement of Lattice Constant

The sintered pellet was pulverized by using a mortar in a glove box and was subjected to crystal structure analysis by using an XRD (X-ray Diffraction analysis) device manufactured by Bruker. A value of an inter-planar spacing d was obtained and a lattice constant was calculated, according to the following formulae by using a (400)-plane peak among X-ray diffraction peaks having been obtained.

$$2d \sin \theta = n\lambda \qquad (1)$$

$$1/d^2 = (h^2 + k^2 + l^2)/a^2 \qquad (2)$$

d: inter-planar spacing, a: lattice constant (4) EDS Analysis of Sintered Body

With respect to each sample, a cross section was observed by a scanning electron microscope (JSM-IT100LV, manufactured by JEOL Ltd.), and the observation point was subjected to EDS analysis, whereby the halogen amount was quantified. With respect to the measurement condition, the acceleration voltage was adjusted according to the type of the halogen to be analyzed. For detection of Cl, which is a light element, the acceleration voltage was set to 5 kV, and for detection of Br and I, the acceleration voltage was set to 15 kV. The current value was adjusted so that the count rate was not smaller than 5000 cps, and the scanning speed was set to 0.1 to 0.5 msec.

Example 1-1

To 100 parts by mass of $Li_{6.25}Ga_{0.25}La_3Zr_2O_{12}$ manufactured by Toshima Manufacturing Co., Ltd., 3 parts by mass of LiCl were mixed and the mixture was mixed in a mortar for 30 minutes. Then, the obtained mixed powder was put in a mold, and a pressure of 375 MPa was applied thereto, whereby a pellet having a diameter of 10 mm and a thickness of about 1 mm was molded. The mixing in the mortar was performed in a glove box (dew-point value: –110° C.) and the molding of the pellet was performed in a dry room. The dew-point temperature in the dry room was –60° C. The pellet was disposed on a spread-out powder of $Li_7La_3Zr_2O_{12}$, manufactured by Toshima Manufacturing Co., Ltd., and was sintered for 1 hour at 1230° C. in a dry nitrogen atmosphere (flow rate: 2 L/min) having a dew-point value of –60° C., whereby a sintered pellet was obtained.

Au was sputtered on both surfaces of the sintered pellet, to form an electrode having a diameter of 8 mm. The obtained sample was set to an all-solid-state battery evaluation cell manufactured by Hohsen Corp., and connected to a potentiostat/galvanostat. Then, impedance measurement was performed in a temperature range from room temperature to 100° C., and the Li ion conductivity at room temperature was evaluated. In addition, an activation energy was calculated from an Arrhenius plot in which a value of the ion conductivity at each temperature was used.

Examples 1-2 to 1-7

A sintered pellet was obtained in the same manner as in Example 1-1, except that an amount of LiCl and a sintering time were changed as described in Table 1.

Examples 2-1 to 2-2

A sintered pellet was obtained in the same manner as in Example 1-3, except that LiI was used in an amount described in Table 1 instead of using 3 parts by mass of LiCl.

Examples 3-1 to 3-2

A sintered pellet was obtained in the same manner as in Example 1-3, except that LiBr was used in an amount described in Table 1 instead of using 3 parts by mass of LiCl.

Comparative Example 1

A sintered pellet was obtained in the same manner as in Example 1-3, except that only $Li_{6.25}Ga_{0.25}La_3Zr_2O_{12}$ was used without adding 3 parts by mass of LiCl.

Table 1 shows the result of measurement performed on sintered pellets obtained in Examples 1-1 to 1-7, 2-1 to 2-2, 3-1 to 3-2, and Comparative Example 1, according to (1) to (3) above. With respect to some Examples and Comparative Example, the halogen element amount in the sintered pellet was identified according to (4) above. The result was 0.02% (Cl) for Example 1-2, 0.08% (Cl) for Example 1-3, 0.11% (Cl) for Example 1-5, 0.07% (Cl) for Example 1-6, 0.09% (Cl) for Example 1-7, 1.52% (I) for Example 2-1, 0.70% (Br) for Example 3-1, 0.86% (Br) for Example 3-2, and not higher than detection limit for Comparative Example 1 (for the halogen element amount, the unit was all at %). Further, all of the sintered pellets obtained in Examples 1-1 to 1-7, Examples 2-1 to 2-2, and Example 3-1 to 3-2 were confirmed to be cubic crystals through XRD analysis of (3) above.

TABLE 1

| | | Li halide | | | Entirety of the oxide | | | | | |
| | | | | | | Total | | | | |
| | | Amount | Sintering | Bulk crystal | | conductivity | | | Relative | Lattice |
| No. | Kind | (parts by mass) | time (hour) | $\sigma_{Bulk}$ (S/cm) | Ea[eV] | $\sigma_{Total}$ (S/cm) | Ea[eV] | | density (%) | constant (Å) |
|---|---|---|---|---|---|---|---|---|---|---|
| Example 1-1 | LiCl | 3 | 1 | — | — | $1.20 \times 10^{-3}$ | 0.20 | | 84.1 | 13.06 |
| Example 1-2 | LiCl | 3 | 6 | — | — | $1.80 \times 10^{-3}$ | 0.22 | | 95.9 | 13.11 |
| Example 1-3 | LiCl | 3 | 20 | — | — | $2.1 \times 10^{-3}$ | 0.20 | | 90.0 | 13.03 |
| Example 1-4 | LiCl | 5 | 6 | — | — | $1.80 \times 10^{-3}$ | 0.21 | | 82.2 | 13.03 |
| Example 1-5 | LiCl | 5 | 20 | — | — | $1.80 \times 10^{-3}$ | 0.21 | | 86.1 | 12.98 |
| Example 1-6 | LiCl | 10 | 6 | — | — | $1.70 \times 10^{-3}$ | 0.21 | | 78.3 | 13.11 |
| Example 1-7 | LiCl | 10 | 20 | — | — | $1.70 \times 10^{-3}$ | 0.20 | | 84.1 | 13.07 |
| Example 2-1 | LiI | 3 | 20 | — | — | $1.30 \times 10^{-3}$ | 0.22 | | 88.1 | 12.97 |
| Example 2-2 | LiI | 5 | 20 | — | — | $1.20 \times 10^{-3}$ | 0.22 | | 86.1 | 12.98 |
| Example 3-1 | LiBr | 3 | 20 | — | — | $1.40 \times 10^{-3}$ | 0.24 | | 92.0 | 12.97 |
| Example 3-2 | LiBr | 5 | 20 | — | — | $1.50 \times 10^{-3}$ | 0.24 | | 88.1 | 12.95 |
| Comparative Example 1 | — | 0 | 20 | $1.10 \times 10^{-3}$ | — | $3.60 \times 10^{-4}$ | 0.27 | | 93.9 | 12.95 |

Table 1 reveals that, in Examples in which the garnet-type oxide containing Li, La, Ga, and Zr, and LiCl, LiI, or LiBr were used, a lithium ion-conducting garnet type oxide having a lithium ion conductivity at room temperature of not lower than $1.0 \times 10^{-3}$ S/cm was realized.

The sintered pellet obtained in each of Examples 1-1, 1-2, and 1-3 above was subjected to elementary analysis by XPS at the surface under the following condition.

XPS device: PHI 5000 Versal ProbeII manufactured by ULVAC-PHI, Inc.

excitation X-ray: Al Kα

X-ray output: 15 kV, 25 W pass energy: 187.85 eV (wide scanning), 58.7 eV (narrow scanning)

charge correction: 284.6 eV (C1s)

With respect to the sintered pellets of Examples 1-1, 1-2, and 1-3, sputtering at the surface was performed at a sputter rate of 1.8 nm/minutes (in terms of $SiO_2$) by using Ar monatomic ions ($Ar^+$), the surface after the sputtering was measured by XPS under the same condition as above, and elementary analysis at positions at depths of 7.2 nm and 43.2 nm from the surface was performed.

Table 2 shows the result. The concentration of each element shown in Table 2 is an average value obtained by performing measurement at two arbitrary places for each data.

TABLE 2

| | Analysis | Concentration of each element (atomic %) | | | | | | |
| | position | Li | C | O | Cl | Ga | Zr | La |
|---|---|---|---|---|---|---|---|---|
| Example 1-1 | Surface | 30.0 | 17.3 | 51.7 | 0.2 | <0.1 | 0.5 | 0.4 |
| | 7.2 nm | 35.4 | 9.5 | 47.3 | 1.4 | 0.2 | 2.5 | 3.6 |
| | 43.2 nm | 35.8 | 12.2 | 29.7 | 2.8 | 4.7 | 5.4 | 9.4 |
| Example 1-2 | Surface | 30.9 | 18.2 | 49.9 | 0.1 | <0.1 | 0.7 | 0.3 |
| | 7.2 nm | 35.1 | 11.6 | 47.4 | 1.1 | 0.2 | 2.3 | 2.4 |
| | 43.2 nm | 33.2 | 10.7 | 33.2 | 3.1 | 4.7 | 6.2 | 8.9 |
| Example 1-3 | Surface | 30.1 | 18.2 | 50.7 | 0.2 | <0.1 | 0.5 | 0.3 |
| | 7.2 nm | 35.2 | 10.3 | 47.4 | 1.4 | 0.2 | 2.3 | 3.2 |
| | 43.2 nm | 33.7 | 12.3 | 33.3 | 3.0 | 4.3 | 5.1 | 8.5 |

Comparative Example 2-1

A sintered pellet was obtained in the same manner as in Example 1-3, except that 3 parts by mass of LiCl were mixed to 100 parts by mass of $Li_{6.25}Al_{0.25}La_3Zr_2O_{12}$ manufactured by Toshima Manufacturing Co., Ltd.

Comparative Example 2-2

A sintered pellet was obtained in the same manner as in Example 1-3, except that 10 parts by mass of LiCl were mixed to 100 parts by mass of $Li_{6.25}Al_{0.25}La_3Zr_2O_{12}$ manufactured by Toshima Manufacturing Co., Ltd.

Table 3 shows the result of measurement for Comparative Examples 2-1 and 2-2, according to (1) to (3) above.

TABLE 3

| | | Li halide | | | Entirety of the oxide | | | | | |
| | | | | | | Total | | | | |
| | | Amount | Sintering | Bulk crystal | | conductivity | | | Relative | Lattice |
| No. | Kind | (parts by mas) | time (hour) | $\sigma_{Bulk}$ (S/cm) | Ea[eV] | $\sigma_{Total}$ (S/cm) | Ea[eV] | | density (%) | constant (Å) |
|---|---|---|---|---|---|---|---|---|---|---|
| Comparative Example 2-1 | LiCl | 3 | 20 | $5.40 \times 10^{-4}$ | 0.31 | $2.80 \times 10^{-4}$ | 0.37 | | 86.1 | 12.97 |

TABLE 3-continued

| | | Li halide | | | Entirety of the oxide | | | | |
| | | | | | | Total | | | |
| | | Amount | Sintering | Bulk crystal | | conductivity | | Relative | Lattice |
| No. | Kind | (parts by mas) | time (hour) | $\sigma_{Bulk}$ (S/cm) | Ea[eV] | $\sigma_{Total}$ (S/cm) | Ea[eV] | density (%) | constant (Å) |
| Comparative Example 2-2 | LiCl | 10 | 20 | $3.70 \times 10^{-4}$ | 0.29 | $2.40 \times 10^{-4}$ | 0.33 | 80.2 | 12.97 |

Example 4-1

A sintered pellet was obtained in the same manner as in Example 1-3, except that 3 parts by mass of LiCl were mixed to 100 parts by mass of $Li_7La_3Zr_2O_{12}$ manufactured by Toshima Manufacturing Co., Ltd.

Examples 4-2

A sintered pellet was obtained in the same manner as in Example 1-3, except that 10 parts by mass of LiCl were mixed to 100 parts by mass of $Li_7La_3Zr_2O_{12}$ manufactured by Toshima Manufacturing Co., Ltd.

Table 4 shows the result of measurement for Examples 4-1 and 4-2, according to (1) to (3) above.

TABLE 4

| | | Li halide | | | Entirety of the oxide | | | | |
| | | | | | | Total | | | |
| | | Amount | Sintering | Bulk crystal | | conductivity | | Relative | Lattice |
| No. | Kind | (parts by mass) | time (hour) | $\sigma_{Bulk}$ (S/cm) | Ea[eV] | $\sigma_{Total}$ (S/cm) | Ea[eV] | density (%) | constant (Å) |
| Example 4-1 | LiCl | 3 | 20 | — | — | $3.50 \times 10^{-4}$ | 0.33 | 90.0 | 12.99 |
| Example 4-2 | LiCl | 10 | 20 | $7.00 \times 10^{-5}$ | 0.29 | $4.90 \times 10^{-5}$ | 0.47 | 80.2 | 13.00 |

The halogen element (Cl) amount in the sintered pellets of Examples 4-1 and 4-2 was identified according to (4) above. The result was 0.02 at % for Example 4-1, and 0.01 at % for Example 4-2.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A lithium ion-conducting garnet type oxide comprising:
Li;
La;
Ga;
Zr;
a halogen element; and
oxygen,
wherein a lithium ion conductivity at room temperature is not lower than $1.0 \times 10^{-3}$ S/cm,
wherein the halogen element is Cl, and
wherein a halogen concentration $C_{Cl}$ (7 nm) in terms of atomic % at a position at a depth of 7 nm from a surface of the lithium ion-conducting garnet type oxide is larger than a halogen concentration $C_{Cl}$ (surface) in terms of atomic % at the surface of the lithium ion-conducting garnet type oxide, and a halogen concentration $C_{Cl}$ (43 nm) in terms of atomic % at a position at a depth of 43 nm from the surface of the lithium ion-conducting garnet type oxide is larger than the halogen concentration $C_{Cl}$ (7 nm) in terms of atomic %.

2. The lithium ion-conducting garnet type oxide according to claim 1, wherein a proportion of Ga with respect to 1 mole of the lithium ion-conducting garnet type oxide is not larger than 0.5 moles.

3. The lithium ion-conducting garnet type oxide according to claim 1, wherein a proportion of Li with respect to 1 mole of the lithium ion-conducting garnet type oxide is not smaller than 6.1 moles and smaller than 6.5 moles.

4. The lithium ion-conducting garnet type oxide according to claim 1, wherein a proportion of Cl with respect to a total of all elements constituting the lithium ion-conducting garnet type oxide is not higher than 0.20 atom %.

5. The lithium ion-conducting garnet type oxide according to claim 1, wherein a lattice constant is not smaller than 12.98 Å.

6. The lithium ion-conducting garnet type oxide according to claim 1, wherein a relative density is not lower than 75%.

7. The lithium ion-conducting garnet type oxide according to claim 1, wherein the halogen concentration $C_{Cl}$ (7 nm) in terms of atomic % at the position at the depth of 7 nm from the surface of the lithium ion-conducting garnet type oxide is not smaller than 5 times and not larger than 13 times the halogen concentration $C_{Cl}$ (surface) in terms of atomic % at the surface of the lithium ion-conducting garnet type oxide, and the halogen concentration $C_{Cl}$ (43 nm) in terms of atomic % at the position at the depth of 43 nm from the surface of the lithium ion-conducting garnet type oxide is not smaller than 1.5 times and not larger than 4 times the halogen concentration $C_{Cl}$ (7 nm) in terms of atomic % at the position at the depth of 7 nm from the surface of the lithium ion-conducting garnet type oxide.

* * * * *